(12) United States Patent
Al-Khayat et al.

(10) Patent No.: US 7,701,101 B2
(45) Date of Patent: Apr. 20, 2010

(54) ALTERNATOR ASSEMBLY

(75) Inventors: Nazar Al-Khayat, Leicestershire (GB);
Nigel Jakeman, Lincolnshire (GB);
Cleveland Mills, Lincolnshire (GB)

(73) Assignee: Cummins Generator Technologies Limited, Lincolnshire (GB)

( * ) Notice: Subject to any disclaimer, the term of this patent is extended or adjusted under 35 U.S.C. 154(b) by 729 days.

(21) Appl. No.: 10/570,072

(22) PCT Filed: Sep. 2, 2004

(86) PCT No.: PCT/GB2004/003760

§ 371 (c)(1),
(2), (4) Date: Oct. 31, 2006

(87) PCT Pub. No.: WO2005/022725

PCT Pub. Date: Mar. 10, 2005

(65) Prior Publication Data

US 2007/0040465 A1 Feb. 22, 2007

(30) Foreign Application Priority Data

Sep. 2, 2003 (GB) ................................. 0320559.8

(51) Int. Cl.
*H02K 3/00* (2006.01)
(52) U.S. Cl. ..................................................... 310/179
(58) Field of Classification Search ................. 310/179, 310/198, 199
See application file for complete search history.

(56) References Cited

U.S. PATENT DOCUMENTS

| 4,117,390 | A | * | 9/1978 | Iwata et al. | 322/90 |
| 4,591,763 | A | * | 5/1986 | Wanasz et al. | 315/304 |
| 4,745,340 | A | | 5/1988 | Wanasz | 315/144 |
| 4,996,457 | A | | 2/1991 | Hawsey et al. | 310/268 |
| 5,334,899 | A | | 8/1994 | Skybyk | 310/268 |
| 5,764,036 | A | | 6/1998 | Waidya et al. | 322/90 |
| 5,808,450 | A | | 9/1998 | Chula et al. | 322/22 |
| 6,094,011 | A | | 7/2000 | Notsu | 315/78 |
| 6,239,552 | B1 | | 5/2001 | Notsu | 315/78 |

FOREIGN PATENT DOCUMENTS

| FR | 2 548 844 | 1/1985 |
| GB | 730512 | 5/1955 |
| JP | 09 233790 A | 9/1997 |

* cited by examiner

*Primary Examiner*—Nguyen N Hanh
(74) *Attorney, Agent, or Firm*—Hamre, Schumann, Mueller & Larson, P.C.

(57) ABSTRACT

The stator (24) of a permanent magnet axial flux alternator comprises two annular stator components which are each wound with a respective two phase winding arrangement (48). Each of the two phase winding arrangements (48) is wound so that there is no mutual inductance between the windings of each phase. Each phase of the two phase winding arrangements (48) wound on the two stator components has a high internal impedance and is for energising a respective high intensity lamp of a light tower.

18 Claims, 7 Drawing Sheets

FIG. 8

ALTERNATOR ASSEMBLY

CROSS-REFERENCES TO RELATED APPLICATIONS

This application is a National Stage filing of International Application PCT/GB2004/003760, filed Sep. 2, 2004, claiming priority to United Kingdom Application No. 0320559.8, filed Sep. 2, 2003, entitled "AN ALTERNATOR ASSEMBLY". The subject application claims priority to PCT/GB2004/003760 and to United Kingdom Application No. 0320559.8 and both references are expressly incorporated by reference herein, in their entirety.

BACKGROUND OF THE INVENTION

This invention relates to an alternator assembly which can provide an output to a plurality of loads and more particularly, although not exclusively, which is operable to provide an initial voltage output sufficient to initiate conduction of each of a plurality of high intensity lamps to be energised followed by a sustaining voltage output to maintain current flow in each of the lamps after the initial conduction.

U.S. Pat. No. 5,808,450 discloses a lighting system which eliminates the need for ballast and voltage regulation in the system by providing an alternator assembly having internal impedance characteristics significantly and substantially above the conventional impedance and by transmitting electrical AC power preferably at a high frequency (say between 200-600 Hz and more particularly between 500-550 Hz) from the alternator usable for direct connection to an associated lamp. In a mobile light tower application, the system preferably has a plurality of lamps and each lamp has a dedicated alternator winding which outputs electrical AC power suitable for direct supply to that lamp. Each winding is preferably formed as a part of a separate alternator unit having its rotor and high impedance output windings. However, an alternator assembly may be provided in which a stator is wound with an appropriate plurality of individual dedicated stator windings, one for each of the lamps to be energised. This would imply the use of a poly-phase machine, one phase for each of the lamps to be energised. However, a poly-phase system operating on a common magnetic circuit would be exposed to inherent mutual inductance between phases. For example, if four lamps were used, this would be proportional to the cosine of 45 degrees (0.707). Thus the reactance of the phases would change and, hence, the luminescence output from each lamp, depending on the number of lamps energized at any one time.

U.S. Pat. Nos. 6,094,011 and 6,239,552 each disclose a discharge lamp lighting system, which does not require ballast between the generator and the lamps wherein the generator includes a plurality of generating coils, one for each lamp, the generating coils being electrically independent from each other. Also a stator of the generator is provided with means by which each of the generating coils is substantially kept from flow of magnetic flux interlinking the other generating coils through the magnetic circuit.

U.S. Pat. No. 4,996,457 discloses a permanent magnet axial flux alternator having a rotor disc between a pair of annular stator discs. Each stator disc carries a winding which has its output connected to a respective load. A magnetic isolator within the rotor isolates the magnets on each side of the rotor and thus isolates each stator disc so that operation of the load connected to one of the stator discs does not affect any operation in the load connected to the other stator disc.

Two forms of alternator assembly which embody this invention and which are for use in a portable light tower are described now by way of example with reference to the specification and the accompanying drawings.

BRIEF SUMMARY OF THE INVENTION

An alternator assembly is disclosed which includes a rotor which carries at least one magnet which establishes an excitation field, and a stator with a plurality of individual stator windings thereon, one for each of a plurality of loads, the stator comprising at least one stator component with at least one pair of the stator windings wound thereon in a two-phase winding arrangement whereby the field induced in the or each stator component by current flow in one of the windings of the respective pair lags the field induced in the respective stator component by current flow in the other winding of the respective pair by 90° so that there is substantially no mutual inductance established between the stator windings wound on the or each stator component, the stator comprising N separate stator components, where N≧2 and 2 N is the number of loads, each stator component having a respective pair of stator windings wound thereon.

One object of the present invention is to provide an improved alternator assembly of the kind to which this invention relates.

Related objects and advantages of the present invention will be apparent from the following description.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
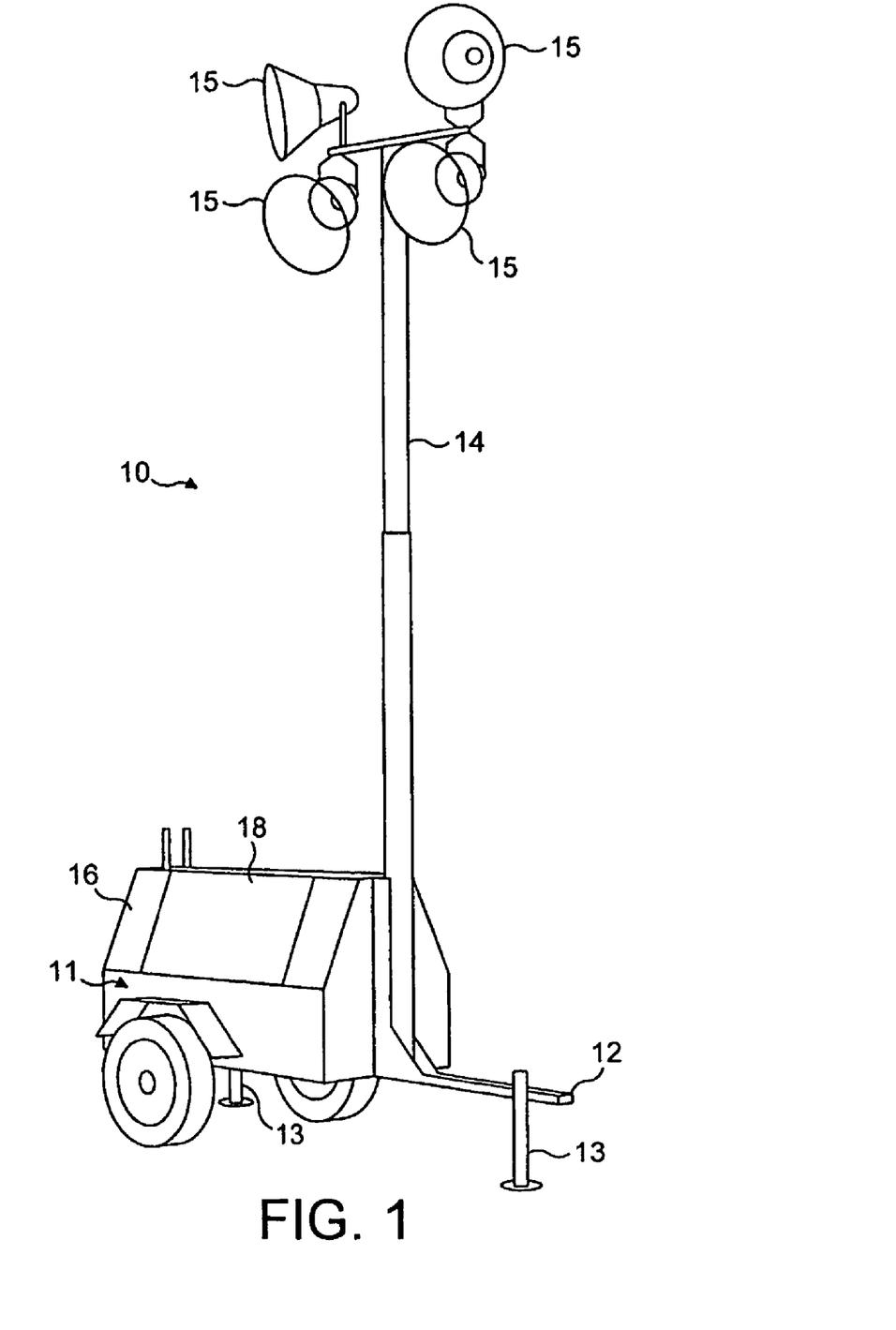
FIG. 1 is a perspective view of a typical light tower.

FIG. 1 shows an exemplary mobile light tower 10 which has a two wheeled trailer 11, a towing hitch 12 and three jacks 13 to support it when stationary. One of the jacks is hidden in FIG. 1. A retractable telescopic boom 14 is mounted on the trailer 11 so as to be upstanding when in use as shown in FIG.

1. In this example, a set of four high intensity lamps 15, such as metal halide lamps, are mounted at the top end of the boom 14 as shown in FIG. 1.

A housing 16 on the trailer 11 has an opening 17 (see FIG. 2) which is closed by a hinged cover 18 and which provides access to the interior of the housing 16 when that cover 18 is open.

Figure 2:
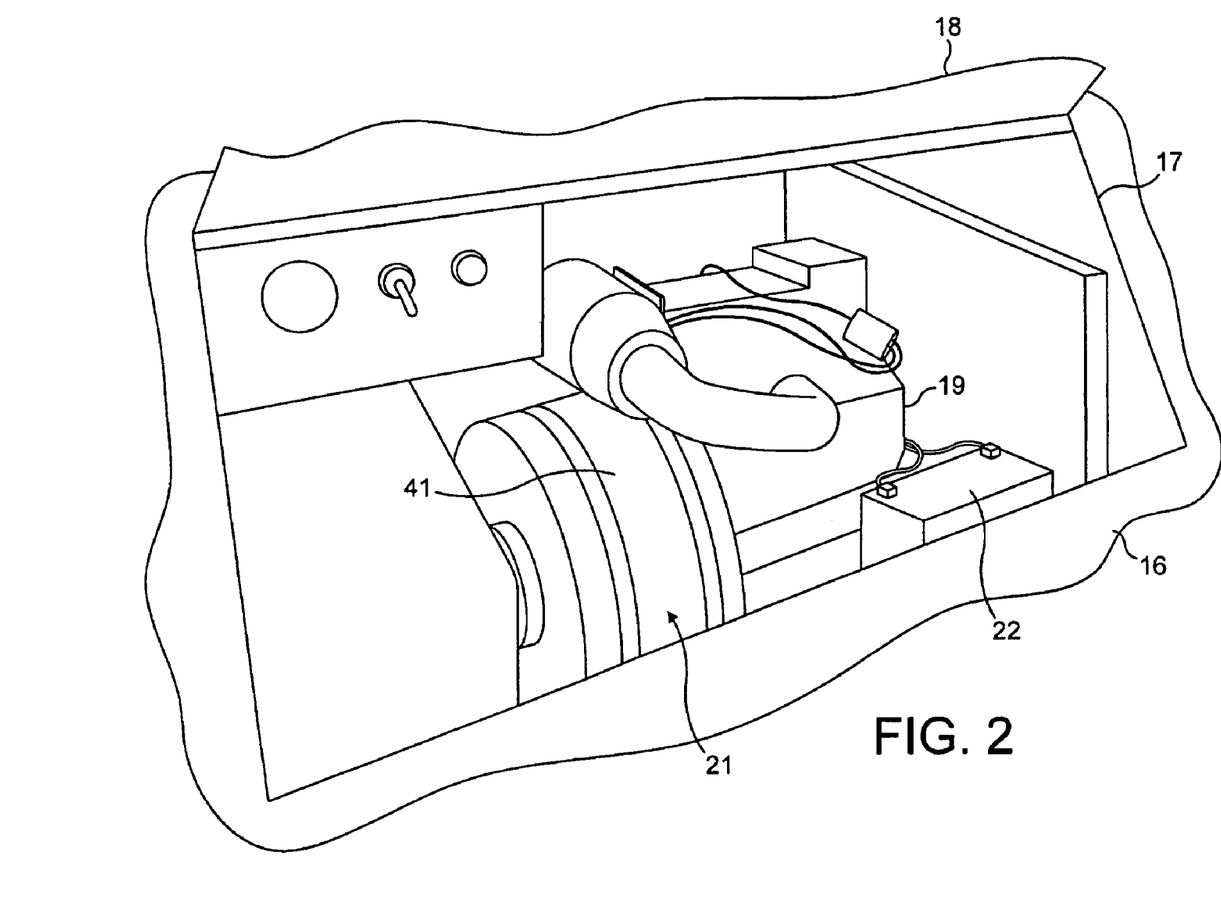
FIG. 2 is a perspective view of an internal combustion engine and an alternator assembly which embodies this invention within a housing of the light tower shown in FIG. 1.

FIG. 2 shows the cover 18 open to reveal a two-stroke internal combustion engine 19 and an alternator assembly 21 within the housing 16. The alternator assembly 21 is an axial flux machine having a rotor and a stator. The rotor is drivingly coupled to the rotary output drive shaft of the engine 19 in place of the usual engine flywheel and acts as the flywheel of the engine 19. A battery 22 for use in starting the engine 16 is also provided in the housing 18.

Any other suitable form of rotary prime mover, such as a single stroke or a three stroke internal combustion engine, may be used to drive the alternator assembly 21 in place of the two stroke internal combustion engine 19.

Figure 3:
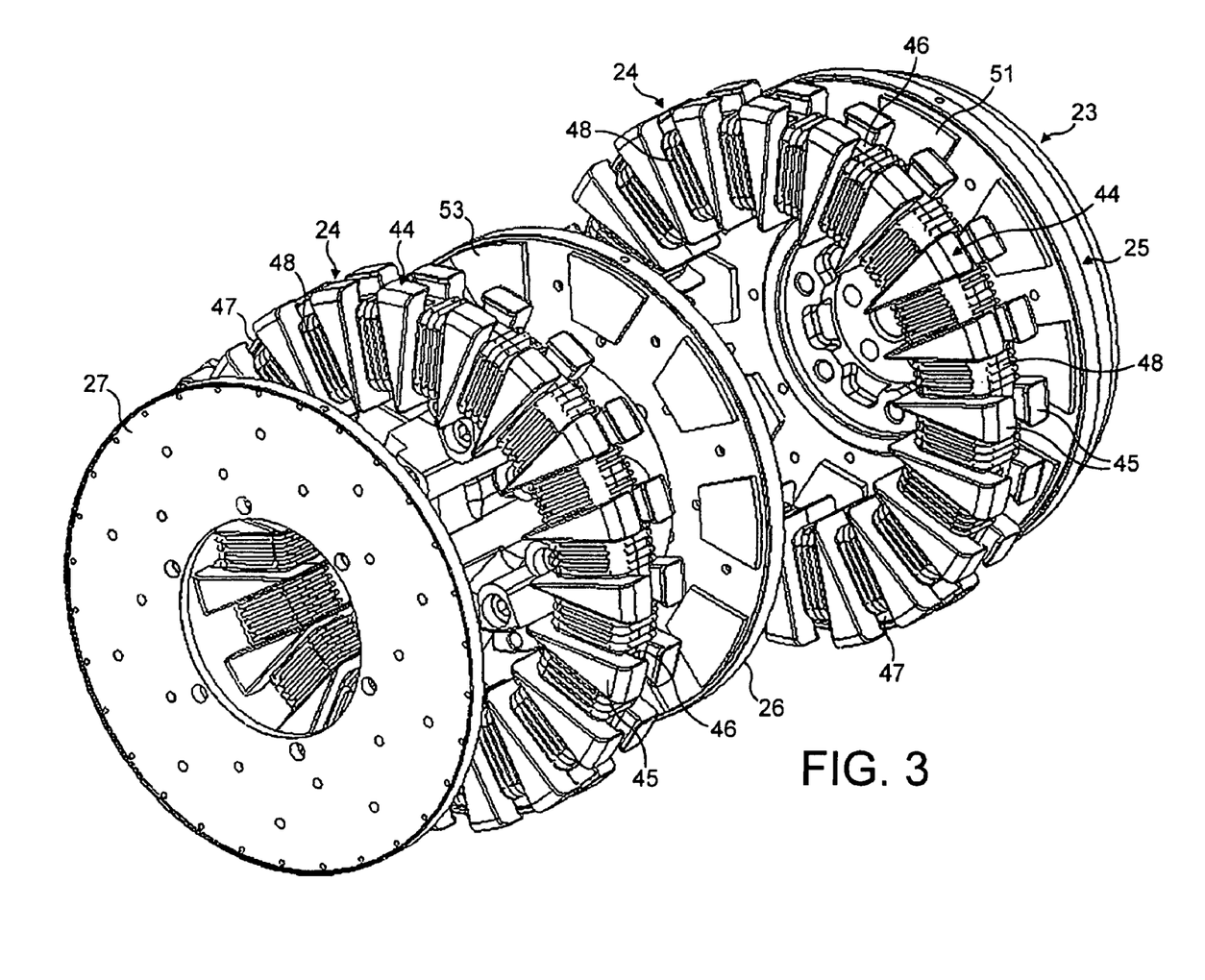
FIG. 3 is an exploded view in perspective of one form of alternator assembly in which this invention is embodied and which is an axial flux machine.
Figure 4:
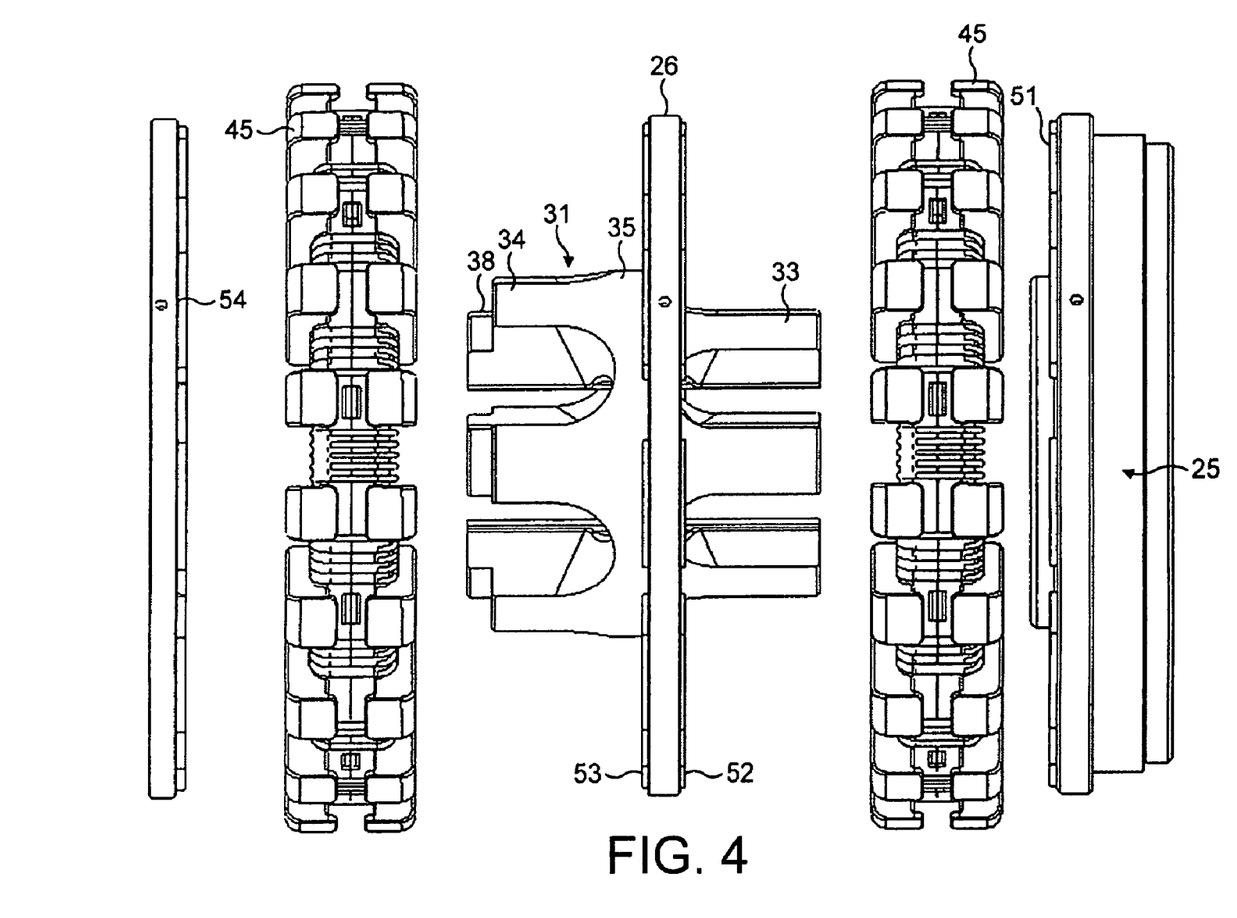
FIG. 4 is an exploded side elevation of the alternator assembly shown in FIG. 3.
Figure 5:
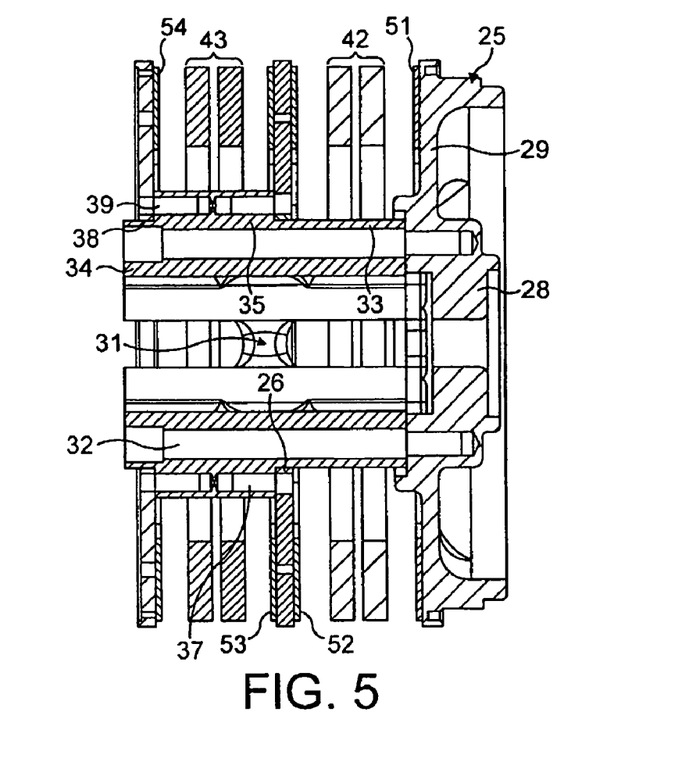
FIG. 5 is a transverse cross-section of the alternator assembly shown in FIGS. 3 and 4 with the hollow annular covers omitted to reveal hidden detail.

FIGS. 3 to 5 show the rotor 23 and stator 24 of one form of the alternator assembly 21. The rotor 23 is formed of three rotor discs 25, 26, 27 which are mounted coaxially. The rotor disc 25 has a hub portion 28 and an annular disc portion 29 which projects radially outwardly from the hub portion 28. The rotor discs 26 and 27 are annular and are each mounted on a generally tubular hub member 31 which is fastened coaxially to the hub portion 28 of the rotor disc 25 by a circular array of setscrews 32. The generally tubular hub member 31 comprises two circular arrays of axially extending circumferentially spaced fingers 33 and 34 which are interconnected by a substantially medial annular portion 35. The outside diameter of the circular array of fingers 33, which extend towards and into contact with the hub portion 28 of the rotor disc 25, is less than that of the circular array of fingers 34 which extend away from the rotor disc 25. The substantially medial annular portion 35 forms an annular shoulder 36 adjacent to its junction with the smaller diameter circular array of fingers 33. The annular rotor disc 26 is seated on the annular shoulder 36 and is fastened to the generally tubular hub member 31 by a circular array of setscrews 37 which extend through the substantially medial annular portion 35 and which are each screwed into a respective one of the larger diameter circular array of axially extending fingers 34. A circular array of arcuate shoulders 38 are formed in the ends of the larger diameter circular array of fingers 34 that are remote from the rotor disc 25. The annular rotor disc 27 is seated on the annular array of arcuate shoulders 38 and fastened to the generally tubular hub member 31 by a circular array of setscrews 39 which are each screwed into a respective one of the fingers 34.

The stator 24 includes a cylindrical outer casing 41 (see FIG. 2) in which two pairs of annular stator cores 42 and 43 are mounted coaxially, one pair, 42, being between the pair of rotor discs 25 and 26 and the other pair, 43, being between the pair of rotor discs 26 and 27 as shown in FIG. 5. The generally tubular hub member 31 extends through the central aperture of the two pairs of annular stator cores 42 and 43. The means of mounting the pairs of annular stator cores 42 and 43 in the cylindrical casing 41 are not shown, but conveniently such means may include an annular support member of a non-ferrous material for each pair. Each support member may be in the form of a spider which includes an annular base portion and a plurality of arms, say six arms, which project radially outwards from the annular base portion. The annular base portion of each spider would be positioned between the annular cores of the respective pair 42, 43 so that the arms project radially outwards beyond the radially outer periphery of the annular cores of the respective pair 42, 43. The annular cores of the respective pair 42, 43 would be attached to the annular base portion of the spider, say by bonding or by the application of adhesive tape. The outer end portions of the arms would be fixed to the cylindrical casing 41 by suitable fixing means. It is to be understood that the pairs of stator cores 42 and 43 are insulated one from the other.

Each annular stator core is an annular disc of ferromagnetic material. Each pair 42, 43 of annular stator cores is encased in a hollow annular cover 44 of plastics material which is a winding carrier and which is shown in FIGS. 3 and 4. The form of each of the hollow annular covers 44 conveniently is substantially similar to that of the two part moulding 34 of an electrically insulating plastics material which has been described and illustrated in our International patent publication WO 02/089292. In particular, each two part hollow annular cover 44 is formed of two similar annular parts which are interlocked at their radially inner and outer peripheral edges. However spaces are formed between circumferentially spaced interlocked portions of the radially outer edges of the two annular parts to provide clearance around each of the radially outwardly projecting arms of the spider, there being one such a space for each radial arm. The resultant hollow annular cover 44 has radially inner and outer annular support portions which are joined together on either side of the respective pair of annular cores 42, 43 of ferromagnetic material by a respective circular array of spaced radial ribs 45 which extend across the respective juxtaposed radial face of the adjacent annular core which is encased in the hollow annular cover 44. The radially inner annular support portions are hidden in FIGS. 3 and 4 but the radially outer annular support portions are visible at 46. The spaced radial ribs 45 form open ended radial passages 47 for electrical phase windings 48 which are wound around the respective pair of annular cores 42, 43 and annular winding cover 44 so that they extend around opposed faces of the inner annular support portion and the outer annular support portion 46 when the respective pair of annular cores 42, 43 is encased in the hollow annular cover 44 and is mounted in the cylindrical casing 41. Each radial rib 45 of each annular winding cover 44 projects radially beyond the respective radially outer annular support portion 46. The radial ribs 45 are tapered radially inwardly so that each open ended radial passage 47 is substantially parallel sided. Each radial rib 45 projects radially inwards beyond the respective radially inner ring portion, as can be seen in FIG. 3.

The open ended radial passages 47 receive stator windings 48 which are torodially wound around each of the two pairs of annular stator cores 42 and 43 that are each encased in the respective annular cover 44. The windings 48 on each of the two pairs of stator cores 42 and 43 are insulated one from the other and are arranged as a two phase winding system. Also each winding 48 has a large number of turns so that it has a high impedance. Each turn of the stator windings 48 is led through an open ended passage 47 of the respective annular cover 44, across the outer periphery of the respective pairs of annular stator cores 42, 43, along the respective open ended passage 47 on the other side of the respective pair of annular stator cores 42, 43 and back through the central aperture of the respective pairs of annular stator cores 42, 43. Each phase of the pair of two phase windings 48 on each of the two annular winding covers 44 within which the respective pair of annular stator cores 42 and 43 are encased is connected to a respective output terminal, each of the four output terminals being connected to a respective one of the four high energy lamps 15 which are to be excited by operation of the alternator assembly 21.

Single annular stator cores may be used instead of each pair 42, 43 of annular stator cores. Each single annular stator core would be encased within the respective hollow annular cover 44 and would be mounted within the cylindrical outer casing 41 by suitable mounting means.

A circular array of alternately polarised permanent magnets 51, 52, 53 and 54 is mounted on each face on each of the three rotor components 25, 26 and 27 that faces the adjacent annular core 42, 43. The configuration of each rotor component face on which a respective circular array of permanent magnets 51-54 is mounted and the means by which those magnets 51-54 are mounted on that face may be as is described and illustrated in our International patent publication No. WO 02/056443 or preferably as described and illustrated in our European patent application No. 04254526.9, priority British patent application No. 0317633.6 filed Jul. 26, 2003. Each of the permanent magnets 51 to 54 establishes an excitation magnetic field. The flux of each of the excitation magnetic fields links with the stator windings 48 that are wound on the respective pair of annular stator cores 42, 43 that the respective permanent magnets 51-54 face so that an emf is induced in those windings 48. That emf is fed to the respective output terminal as an output voltage for energizing the respective high energy lamp 15.

The stator windings 48 are toroidally wound in pairs on each pair of annular stator cores 42, 43 as a two phase winding, each insulated from the other, so that the mutual inductance between the phases on each pair of annular stator cores 42, 43 is zero. Electrically speaking, this is due to their perpendicular alignment in space, so that the field induced in the respective stator cores 42, 43 by current flow in one of the windings of the respective pair of windings 48 lags the field induced in the respective stator cores 42, 43 by current flow in the other winding of the respective pair of windings 48 by 90°. The mutual inductance M between the phases of such a two phase winding system is proportional to the cosine of 90° C. which is zero.

Figure 6:
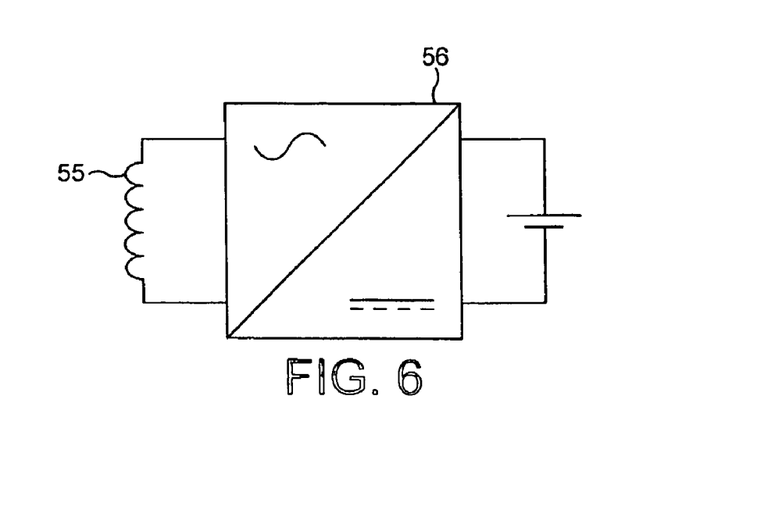
FIG. 6 is a circuit diagram of a battery charging circuit for the battery of the light tower shown in FIG. 1.

In addition to the two-phase stator windings 48, the alternator assembly 21 shown in FIGS. 3 to 5 may be provided with at least one auxiliary coil in which an emf would be generated by rotation of the rotor 23. The emf generated in the auxiliary coil or coils would be used to charge the battery 22 so that there would be no need to provide a separate engine driven alternator for that purpose as is customary. The or each such an auxiliary coil would be wound on a respective one of the annular covers 44 alongside a group of turns of the stator windings 48 between a juxtaposed pair of the radial ribs 45. FIG. 6 shows the output of such an auxiliary coil 55 would be connected to an input of an AC/DC convertor 56 which has positive and negative output terminals which are connected to the positive and negative terminals of the battery 22.

Figure 7:
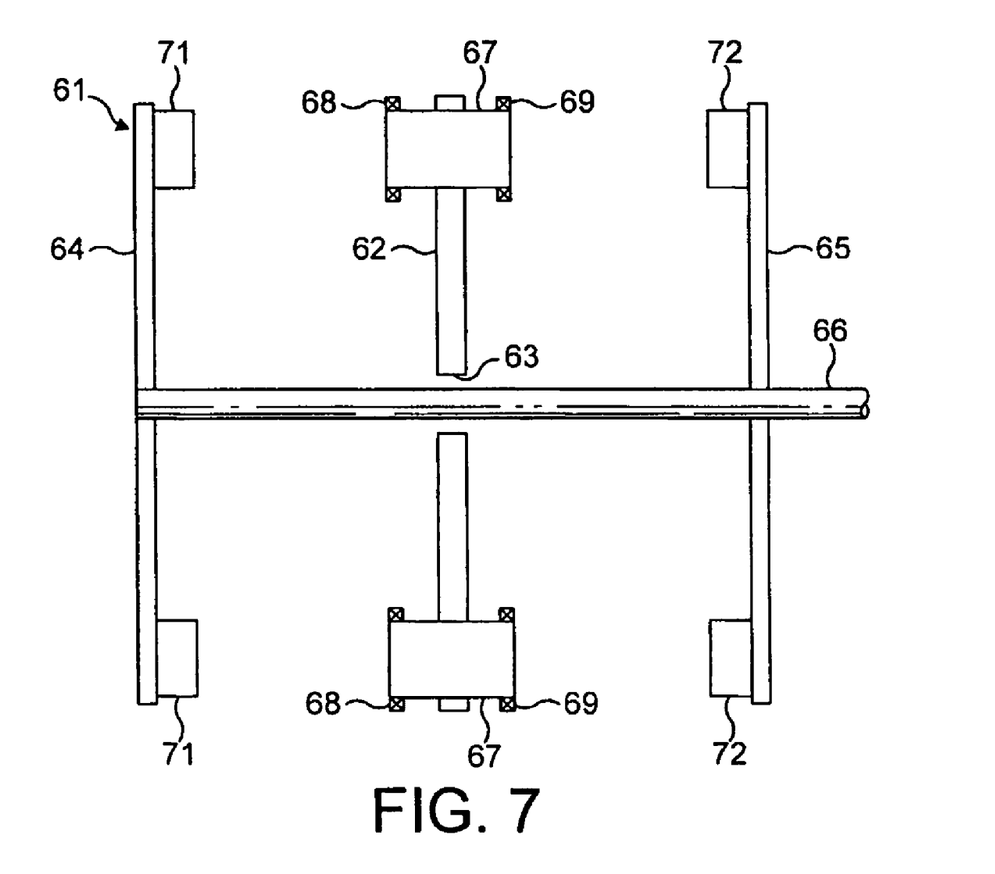
FIG. 7 is a diagrammatic representation of another form of alternator assembly in which this invention is embodied and which is an axial flux machine.
Figure 8:
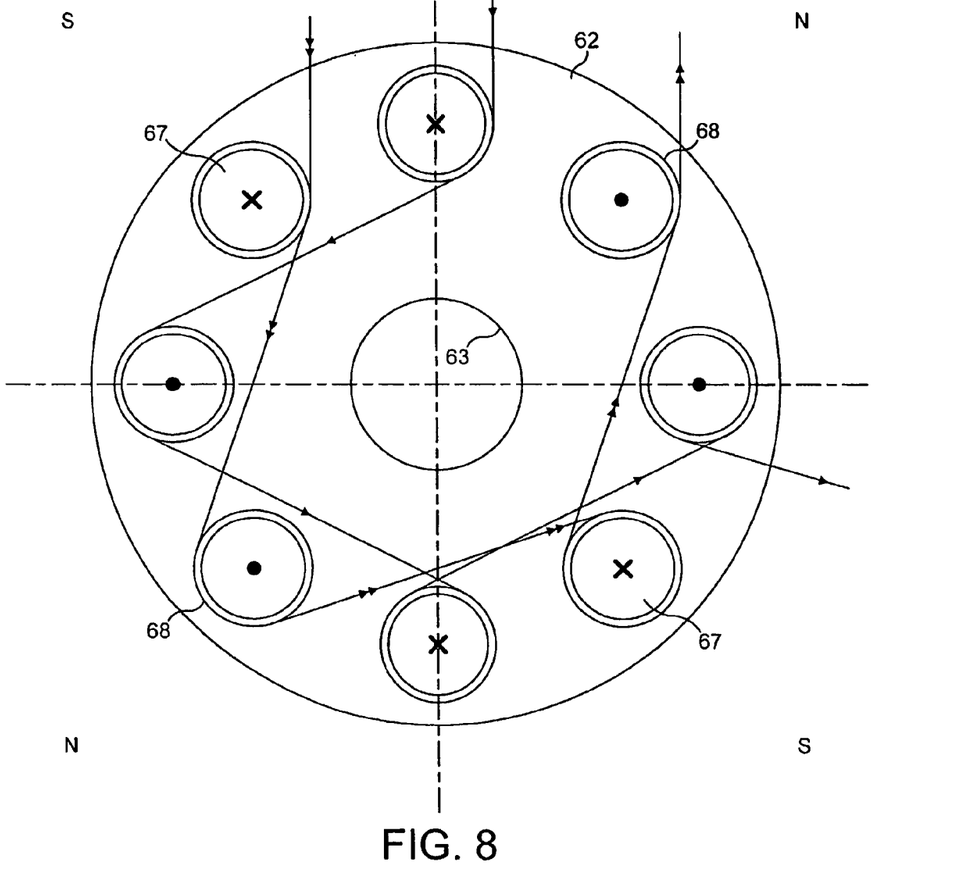
FIG. 8 is a side view of a stator of the alternator assembly shown in FIG. 7.

FIGS. 7 and 8 show another form of alternator assembly 21 which has a rotor 61 and an annular stator core 62 which has a central aperture 63. The rotor 61 is formed of two similar rotor discs 64 and 65 which are mounted coaxially, one at either end of an axle 66. The axle 66 extends through the central aperture 63 of the annular stator core 62 so that the annular stator core 62 is between the rotor discs 64 and 65.

The annular stator core 62, which is formed of a ferromagnetic material, carries a circular array of an even number of teeth 67 which are formed of a ferrous metal and which each project towards the rotor discs 64 and 65.

A stator winding 68, 69 is wound on the end face of each tooth 67 which faces the adjacent rotor disc 64, 65. Hence there are two stator windings 68 and 69 wound at opposite ends of each tooth 67. The turns of each stator winding 68, 69 extend around an axis which is substantially parallel to the axis of rotation of the rotor 61.

By way of example, FIG. 8 shows that the stator windings 68 on the left hand side of the annular stator core 62, as seen in FIG. 7, are wound on 8 teeth 67 and are interconnected in a two-phase, 4-pole winding arrangement which has two inputs and two outputs. For the sake of clarity, the stator windings 68 of one of the phases are shown with single headed arrows and the stator windings 68 of the other phase are shown with double headed arrows. The direction of the magnetic field induced in each tooth 67 by current flow in the windings 68 wound on that tooth 67 is indicated by either "x" or "•". "x" indicates that the direction of the field is into the plane of the paper and "•" indicates that the field is emerging from the plane of the paper. The positions of the 4 poles of the main permanent magnet field excitation are indicated by the letters "N" and "S". Starting with the stator windings 68 of each phase that are directly connected to the respective input, the stator windings 68 on each of the teeth 67 are connected to the stator windings 68 on the next but one tooth 67 in the anti-clockwise direction as seen in FIG. 8 so that, apart from the teeth 67 that are wound with stator windings 68 that are directly connected to the respective input or output, a tooth 67 wound with windings of one phase of the two phase winding arrangement is between a pair of teeth 67 wound with the windings 68 of the other phase of the two-phase winding arrangement. The stator windings 69 on the right hand side of the annular stator core 62, as seen in FIG. 8, are interconnected similarly in another two-phase winding arrangement. As was the case with the two-phase stator winding arrangement of the alternator assembly described above with reference to and as illustrated in FIGS. 3 to 5, the mutual inductance between the phases of either of the two-phase windings 68 and 69 on the stator core 62 is zero. Further, the windings 68 and 69 are wound on each tooth 67 so that the fields induced in each tooth 67 by current flow in the windings 68 and 69 wound thereon oppose one another and are on either side of a magnetic neutral at the centre of the respective tooth 67 so that the windings 68 and 69 on each of the teeth 67 are electromagnetically isolated from one another.

Each tooth 67 and the annular stator core 62 may be separated into two parts by a layer of insulating material, which extends in a substantially diametral plane in the centre of the annular stator core 62, so that the two individual stator windings 68 and 69 wound on each tooth 67 are insulated one from the other, if necessary.

Each rotor disc 64, 65 carries a circular array of alternately polarised permanent magnets 71, 72 on its face that faces the circular array of teeth 67 so that an air gap is formed between each tooth 67 and the magnets 71, 72 that it faces and such that rotation of the rotor 61 relative to the annular stator core 62 induces an emf in each phase of the windings 68 and 69 carried by the annular core 62. Each phase of the stator winding 68, 69 is connected to a respective output terminal of the alternator assembly 21 for connection to a respective high intensity lamp 15 which is to be energized by operation of the alternator assembly 21.

Each of the alternator assemblies 21 described above with reference to the accompanying drawings has substantial internal impedance characteristics. This is because the stator windings are wound with a large number of turns. Also they are arranged so as to avoid mutual coupling and thereby to enable individual lamp switching and, in the event of failure of a lamp, to provide for protection of the other lamps.

Accordingly these alternator assemblies 21 in which this invention is embodied are operable so that each of the stator windings initially provides an output voltage sufficient to initiate conduction of the respective high intensity lamp 15 to which they are connected followed, due to the effect of the high impedance of the respective stator windings which limits the current supply to the respective lamp, by a lower sustaining output voltage which maintains current flow in the respective lamp after the initial conduction in the lamp 15. In practice, the alternator assembly 21 will be provided with as many stator windings as there are lamps to be energized. Where necessary, additional annular stator cores would be provided to carry the additional stator windings which, where necessary, would be wound in a two-phase winding arrangement on each annular stator core as described above. Furthermore, an alternator assembly in which this invention is embodied can be used to drive loads other than high intensity lamps.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An alternator assembly which includes a rotor which carries a circular array of alternately polarized permanent magnets which establish an excitation field, and a stator with a plurality of individual stator windings thereon, one for each of a plurality of loads, the stator comprising N separate stator components, where N≧2 and 2 N is the number of loads, each stator component having a respective pair of stator windings wound thereon in a two-phase winding arrangement whereby the field induced in a respective stator component by current flow in one of the windings of the respective pair lags the field induced in the respective stator component by current flow in the other winding of the respective pair by 90° so that there is substantially no mutual inductance established between the stator windings wound on the respective stator component, wherein the N stator components are supported coaxially in a row, wherein the rotor includes (N+1) of the rotor components which each carry a circular array of permanent magnets on a face which faces an adjacent stator component, and wherein (N−1) rotor components are supported coaxially in a row for rotation one between a juxtaposed pair of stator components, each rotor component carrying a circular array of the permanent magnets on the radial face that faces an adjacent stator component.

2. An alternator assembly according to claim 1, which is an axial flux machine.

3. An alternator assembly according to claim 1, wherein the individual stator windings include one winding which is dedicated for each of a plurality of lamps to be energized, the alternator assembly being operable so that each of the dedicated stator windings provides an output voltage sufficient to initiate conduction of the respective lamp followed by a sustaining output voltage to maintain current flow after initial conduction; each said dedicated stator winding being arranged to create sufficient internal impedance within the alternator assembly after initial conduction to limit the current supply to the respective lamp.

4. An alternator assembly according to claim 1, wherein said alternator assembly includes at least one auxiliary coil which is wound on said stator and which is insulated from said stator windings, said auxiliary coil having ends by which it is connected to an input of AC/DC conversion means having a DC output which is for connection to terminals of an electric battery which is provided for operation of a prime mover which is to be drivingly coupled with the alternator assembly, the arrangement being such that when the alternator assembly is driven by said prime mover, the battery is charged by the output of said at least one auxiliary coil converted by said AC/DC conversion means.

5. An alternator assembly which includes a rotor which carries a circular array of alternately polarized permanent magnets which establish an excitation field, and a stator with a plurality of individual stator windings thereon, one for each of a plurality of loads, the stator comprising N separate stator components, where N≧2 and 2 N is the number of loads, each stator component having a respective pair of stator windings wound thereon in a two-phase winding arrangement whereby the field induced in a respective stator component by current flow in one of the windings of the respective pair lags the field induced in the respective stator component by current flow in the other winding of the respective pair by 90° so that there is substantially no mutual inductance established between the stator windings wound on the respective stator component, wherein the N stator components are supported coaxially in a row and the rotor includes at least (N−1) rotor components which are supported coaxially in a row for rotation one between a juxtaposed pair of stator components, each rotor component carrying a circular array of the permanent magnets on the radial face that faces an adjacent stator component, and wherein the rotor components include one rotor disc which has an integral hub portion and a radially-extending disc portion, a generally tubular member which is arranged to rotate substantially coaxially with the integral hub portion and two other rotor discs which are annular and which are arranged on the generally tubular member.

6. An alternator assembly according to claim 5, wherein a radially outer surface of said generally tubular member has a larger diameter portion and a smaller diameter portion which is the portion of the generally tubular member which is fixed to the integral hub portion of said one rotor disc, said other rotor discs being seated in respective annular shoulder arrangements formed at either end of the larger diameter portion.

7. An alternator assembly according to claim 5, wherein said one rotor disc is adapted to be coupled with an output drive shaft of a rotary prime mover and is massive compared to the two other rotor discs so that it will function as a flywheel of the prime mover.

8. An alternator assembly according to claim 7, wherein said rotary prime mover is a single stroke, two stroke or a three stroke internal combustion engine and said one rotor disc is an out of balance rotary component, the degree of out of balance having been selected so that, when said one rotor disc is coupled to the output drive shaft of the two stroke or three stroke internal combustion engine, the resulting rotary assembly will be substantially balanced.

9. An alternator assembly which includes a rotor which carries at least one magnet which establishes an excitation field, and a stator with a plurality of individual stator windings thereon, one for each of a plurality of loads, the stator comprising at least one stator component with at least one pair of the stator windings wound thereon in a two-phase winding arrangement whereby the field induced in a respective stator component by current flow in one of the windings of the respective pair lags the field induced in the respective stator component by current flow in the other winding of the respective pair by 90° so that there is substantially no mutual inductance established between the stator windings wound on the respective stator component, wherein the alternator assembly is an axial flux machine, and the rotor includes a rotor disc and said at least one stator component includes a stator core, the rotor disc being formed of a ferrous metal and being journalled for rotation about an axis relative to the stator core from which it is spaced in the direction of the axis of rotation, the stator core having a circular array of teeth which are formed of a ferrous metal and which project towards the rotor disc so that an air gap is formed between the rotor disc and the surfaces of the teeth that are nearest to the rotor disc, there being a respective one of said least one pair of the stator windings wound on each of the teeth such that the excitation field established by said magnet carried by the rotor links with individual stator windings to induce an emf in individual stator windings wherein alternate teeth or alternate groups of juxtaposed teeth are wound with a different one of the two stator windings of the two phase winding arrangement so that a tooth or group of teeth wound with the windings of one phase is between a pair of teeth or groups of teeth wound with the windings of the other phase.

10. An alternator assembly according to claim 9, wherein the individual stator windings include one winding which is dedicated for each of a plurality of lamps to be energized, the alternator assembly being operable so that each of the dedicated stator windings provides an output voltage sufficient to initiate conduction of a respective lamp followed by a sustaining output voltage to maintain current flow after initial conduction; each said dedicated stator winding being arranged to create sufficient internal impedance within the alternator assembly after initial conduction to limit the current supply to the respective lamp.

11. An alternator assembly according to claim 9, wherein the rotor disc is one of two rotor discs which are mounted on a common component for conjoint rotation about said axis and the stator core is annular with a central aperture and is positioned between the two rotor discs which are both orientated similarly, the teeth projecting from the stator core towards each of the rotors discs and said common component extending through said central aperture, wherein there is a respective two phase winding arrangement similarly wound on the teeth at either end so that a tooth or a group of juxtaposed teeth wound with the windings of one phase of each of the pair of two phase winding arrangements is between a pair of teeth or groups of teeth wound with the windings of the other phase of the pair of two phase winding arrangements, the windings being wound on the teeth so that the fields induced in the teeth by current flow in the windings wound thereon oppose one another so that the windings on each teeth are electromagnetically isolated from one another.

12. An alternator assembly according to claim 9, wherein each tooth is insulated from the other teeth on the stator core.

13. An alternator assembly according to claim 9, wherein each of the individual stator windings wound on a tooth is wound onto a bobbin which is fitted onto the respective tooth.

14. An alternator assembly according to claim 9, wherein each of the individual stator windings wound onto the teeth of the stator core is fly-wound around a group of two or more juxtaposed teeth.

15. An alternator assembly according to claim 9, wherein the rotor is adapted to be coupled with an output drive shaft of a rotary prime mover by a massive rotor disc which will function as a flywheel of the prime mover.

16. An alternator assembly according to claim 15, wherein said rotary prime mover is a single stroke, two stroke or a three stroke internal combustion engine and said massive rotor disc is an out of balance rotary component, the degree of out of balance having been selected so that, when said massive rotor disc is coupled to the output drive shaft of the two stroke or three stroke internal combustion engine, the resulting rotary assembly will be substantially balanced.

17. An alternator assembly according to claim 9, wherein said alternator assembly includes at least one auxiliary coil which is wound on said stator and which is insulated from said stator windings, said auxiliary coil having ends by which it is connected to an input of AC/DC conversion means having a DC output which is for connection to terminals of an electric battery which is provided for operation of a prime mover which is to be drivingly coupled with the alternator assembly, the arrangement being such that when the alternator assembly is driven by said prime mover, the battery is charged by the output of said at least one auxiliary coil converted by said AC/DC conversion means.

18. A portable light tower including a plurality of lamps and an alternator assembly, the alternator assembly including a rotor which carries a circular array of alternately polarized permanent magnets which establish an excitation field; and a stator with a plurality of individual stator windings thereon, one for each of a plurality of loads, the stator comprising N separate stator components, where $N \geqq 2$ and 2 N is the number of loads, each stator component having a respective pair of stator windings wound thereon in a two-phase winding arrangement whereby the field induced in a respective stator component by current flow in one of the windings of the respective pair lags the field induced in the respective stator component by current flow in the other winding of the respective pair by 90° so that there is substantially no mutual inductance established between the stator windings wound on the respective stator component, wherein the N stator components are supported coaxially in a row, wherein the rotor includes (N+1) of the rotor components which each carry a circular array of permanent magnets on a face which faces an adjacent stator component, wherein (N−1) rotor components are supported coaxially in a row for rotation one between a juxtaposed pair of stator components, each rotor component carrying a circular array of the permanent magnets on the radial face that faces an adjacent stator component, and wherein each winding of the alternator assembly is connected to a respective lamp of the light tower so that the lamps are energized when the alternator assembly is driven by a rotary prime mover.

* * * * *